Patented Dec. 2, 1952

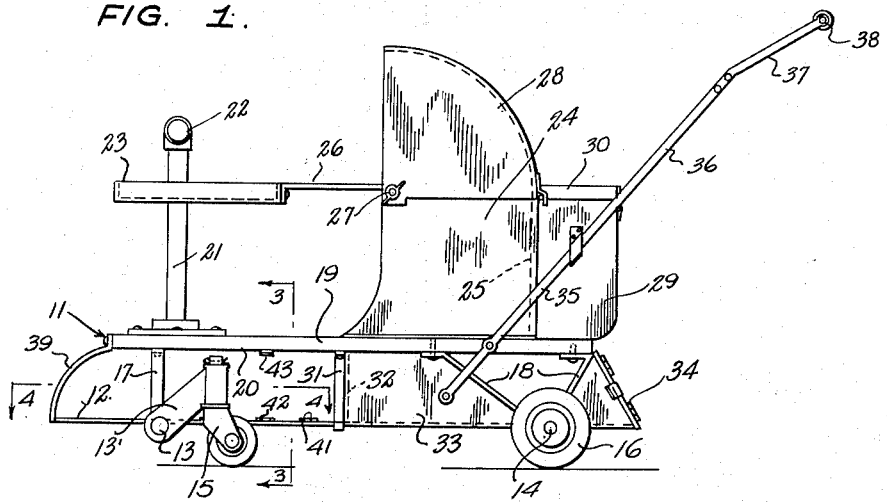

2,620,017

UNITED STATES PATENT OFFICE 2,620,017

BABY WALKER

Francis H. Ford, Toledo, Ohio

Application July 9, 1948, Serial No. 37,829

2 Claims. (Cl. 155—22)

This invention relates to children's vehicles and more particularly to a combined baby walker and package carrier.

A main object of the invention is to provide a novel and improved combination child's vehicle and package carrier which is very simple in construction, compact in size and easy to manipulate.

A further object of the invention is to provide an improved combination child's vehicle and package carrier which is inexpensive to manufacture, sturdy in construction, neat in appearance, and which is useful in encouraging a child to learn to walk.

Further objects and advantages of the invention will become apparent from the following description and claims, and from the accompanying drawings wherein:

Figure 1 is a side elevational view of a combination child's vehicle and package carrier constructed in accordance with the present invention.

Figure 2 is a top plan view of the combination vehicle of Figure 1.

Figure 3 is a fragmentary enlarged transverse cross-sectional detail view taken on line 3—3 of Figure 1.

Figure 4 is a fragmentary cross-sectional detail view taken on line 4—4 of Figure 1.

Referring to the drawings, 11 designates the vehicle generally, said vehicle comprising a bottom platform 12 supported on a transverse front axle 13 and a transverse rear axle 14, said axles being secured to the underside of the platform.

Secured adjacent each end of axle 13 is a caster bearing 13' in which are vertically journaled casters 15 and journaled on axle 14 are wheels 16, 16. Arranged longitudinally of and spaced above the platform 12 and fixedly secured thereto is a seat board 19, the seat board being supported by front struts 17, 17 and rear struts 18, 18 at each side of the platform. The seat board has opposed longitudinal cut outs extending inwardly from its sides and spaced from one end thereof to form recesses for the accommodation of the legs of a child when seated thereon. Secured to said forward portion 20 at its front end is a vertical post member 21 to the top of which are secured laterally projecting handle bars 22, 22 and to the intermediate portion of which is secured a generally rectangular tray 23. Secured to the rear side marginal portions of seat board 19 are side panels 24, 24 and a rear transverse panel 25 defining a seat enclosure. The top forward corners of the side panels 24 are secured to the rearward corners of tray 23 by rigid convergent brace members 26, 26. Pivotally secured to said top forward corners by wing bolts 27, 27 is a hood 28 which may be of conventional foldable construction. The hood 28 may be quickly detached from the vehicle by merely unscrewing the wing bolts 27, 27.

Secured to the rear panel 25 and to the underlying rear portion of seat board 19 is a generally rectangular rigid receptacle 29 having a hinged top closure 30. Seat board 19 is connected to platform 12 at its intermediate side portions by depending struts 31 and rearwardly of said struts a bottom storage space is defined between the seat board 19 and the bottom platform 12 by a vertical transverse panel 32, side panels 33 and a rear hinged closure 34, which, as shown in Figure 1, is hinged on an inclined axis so that the closure may be easily opened from behind and from above the rear portion of the vehicle.

Embracing and secured to the side edge of seat board 19 and the respective side panels 33 are the lower portions of arms 35, 35 of a yoke structure 36 extending upwardly and rearwardly from the vehicle. The top end of the yoke structure is formed with divergent arms 37, 37 between which is secured a handle 38. By pushing on handle 38 the vehicle may be readily moved and guided forwardly. The upward inclination of yoke structure 36 is substantial so that access may be easily had to rear bottom closure 34 for inserting packages into the bottom storage compartment or for removing packages therefrom. At the same time, access may be readily had to the top closure 30 of the upper storage compartment 29.

A rigid brace strut 39 connects the front ends of seat board 19 and bottom platform 12.

The forward portion of the bottom platform 12 has a pair of longitudinal openings extending therethrough and spaced from each other and in registry with the recesses in the seat board 19. A horizontally disposed panel 40 is positioned in each of the openings and is connected along one side edge 41 to the adjacent portion of the platform 12 for movement from the horizontal position to a vertical position. The panels 40, 40 are normally supported in horizontal flush positions with respect to platform 12 by outwardly extending lugs carried by the outer panel margins and shown at 42. When it is desired to open the lower forward portion of the platform, as when the child is learning to walk, the panels 40, 40 are swung upwardly and secured in inoperative raised positions by engaging the lugs 42, 42 carried by the free panel edges with cooperating corrugated spring catch means 43 carried by the underside of the reduced forward portion 20 of the seat board 19.

While a specific embodiment of a combined child's vehicle and package carrier has been disclosed in the foregoing description, it will be understood that various modifications within the spirit of the invention may occur to those skilled in the art. Therefore it is intended that no limitations be placed on the invention other than as defined by the scope of the appended claims.

What is claimed is:

1. A baby walker comprising a wheeled platform, a seat board arranged longitudinally of and spaced above said platform and fixedly secured thereto, said seat board having opposed longitudinal cutouts extending inwardly from its sides and spaced from one end thereof to form recesses for the accommodation of the legs of a child when seated thereon, said platform having a pair of longitudinal openings extending therethrough spaced from each other and in register with said recesses, a horizontally disposed panel positioned in each of said openings, each of said panels being connected along one side edge to the adjacent portion of said platform for movement from the horizontal position to a vertical position, a latching means carried by the under face of said seat board and engageable with the other side edge of each of said panels to hold the latter in their vertical positions, and means projecting from the other side edge of each of said panels and bearing upon the adjacent portion of said platform to hold the panels in their horizontal positions.

2. A baby walker comprising a wheeled platform, a seat board arranged longitudinally of and spaced above said platform and fixedly secured thereto, said seat board having opposed longitudinal cut outs extending inwardly from its sides and spaced from one end thereof to form recesses for the accommodation of the legs of a child when seated thereon, said platform having a pair of longitudinal openings extending therethrough spaced from each other and in register with said recesses, a horizontally disposed panel positioned in each of said openings, each of said panels being connected along one side edge to the adjacent portion of said platform for movement from the horizontal position to a vertical position, releasable latching means carried by the under face of said seat board and engageable with the other side edge of each of said panels to hold the latter in their vertical positions, and a lug projecting from the other side edge of each of said panels and bearing upon the adjacent portion of said platform to hold the panels in their horizontal positions.

FRANCIS H. FORD.

REFERENCES CITED

The following references are of record in the file of this patent:

UNITED STATES PATENTS

| Number | Name | Date |
|---|---|---|
| 1,350,401 | Zoch | Aug. 24, 1920 |
| 1,652,004 | Fischer | Dec. 6, 1927 |
| 1,875,107 | Mueller | Aug. 30, 1932 |
| 1,928,807 | Barschow | Oct. 3, 1933 |
| 2,375,389 | Shuler | May 8, 1945 |
| 2,422,241 | Johnson | June 17, 1947 |